United States Patent [19]

Bartlett

[11] Patent Number: 5,221,492

[45] Date of Patent: Jun. 22, 1993

[54] AZEOTROPIC MIXTURE OF PERFLUOROPROPANE AND DIMETHYL ETHER

[75] Inventor: Philip L. Bartlett, Wilmington, Del.

[73] Assignee: E. I. Du Pont de Nemours and Company, Wilmington, Del.

[21] Appl. No.: 749,162

[22] Filed: Aug. 23, 1991

[51] Int. Cl.$^5$ .............. C08J 9/14; C09K 3/30; C09K 5/04; C11D 7/30

[52] U.S. Cl. .................. 252/67; 62/114; 252/162; 252/170; 252/171; 252/305; 252/364; 252/DIG. 9; 264/53; 264/54; 264/DIG. 5; 521/98; 521/131; 521/910

[58] Field of Search .............. 252/67, 162, 170, 171, 252/305, 364, DIG. 9; 62/114; 264/53, 54, DIG. 5; 521/98, 131, 910

[56] References Cited

U.S. PATENT DOCUMENTS

| | | | |
|---|---|---|---|
| 4,613,115 | 9/1986 | Smith | 267/64.25 |
| 4,783,276 | 11/1988 | Bohnenn | 252/67 |
| 4,933,247 | 6/1990 | Osawa et al. | 430/66 |
| 4,939,056 | 7/1990 | Hotomi et al. | 430/66 |
| 4,994,337 | 2/1991 | Masaki et al. | 430/67 |
| 5,061,394 | 10/1991 | Bivens et al. | 252/171 |

FOREIGN PATENT DOCUMENTS

| | | |
|---|---|---|
| 384371 | 8/1990 | European Pat. Off. . |
| 443912 | 8/1991 | European Pat. Off. . |
| 2737132 | 2/1978 | Fed. Rep. of Germany . |
| 4003270 | 8/1991 | Fed. Rep. of Germany . |
| 86-026832 | 6/1986 | Japan . |
| 91/13968 | 9/1991 | World Int. Prop. O. . |
| 91/16390 | 10/1991 | World Int. Prop. O. . |

OTHER PUBLICATIONS

*Aerosol Report*, vol. 25, No. 3/88, by Bohnenn et al., "Update and Review of DME Propellant 1988", pp. 119–120.

Du Pont Dymel® Bulletin, E-70287, "A New Era in Aerosol Propellants".

*Primary Examiner*—Linda Skaling

[57] ABSTRACT

A binary azeotropic mixture of perfluoropropane or 1,1,1,2,3,3,3-heptafluoropropane and dimethyl ether.

10 Claims, No Drawings

AZEOTROPIC MIXTURE OF PERFLUOROPROPANE AND DIMETHYL ETHER

BACKGROUND OF THE INVENTION

This invention relates to compositions of fluorinated hydrocarbons and, more specifically, to azeotropic mixtures of perfluoropropane or 1,1,1,2,3,3,3-heptafluoropropane with dimethyl ether.

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various types of polyurethane foams require blowing agents for their manufacture. Insulating foams depend on the use of halocarbon blowing agents, not only to foam the polymer but primarily for their low vapor thermal conductivity, a very important characteristic for insulation value. Historically, polyurethane foams are made with CFC-11 as the primary blowing agent. Phenolic polymers have been foamed for insulation and they have very attractive flammability characteristics. These polymers are generally made with CFC-11 and CFC-113 blowing agents. Thermoplastics, such as polystyrene, have been foamed for insulation and polyolefins, such as polyethylene and polypropylene, have been foamed and are widely used in packaging. These thermoplastic foams are generally made with CFC-12. Many products designed for household, personal or industrial use are available as aerosol products. All such products utilize the pressure of a propellant gas or a mixture of propellant gases (i.e., a propellant gas system) to expel the active ingredients from the container. For this purpose, aerosols employ liquified gases which vaporize and provide the pressure to propel the active ingredients when the valve on the aerosol container is pressed open.

Many refrigeration applications, e.g., refrigerators and auto air conditioners, presently use CFC-12 as the refrigerant. The subject azeotropes offer environmentally acceptable substitutes for CFC-12.

Recently the long-term environmental effects of chlorofluorocarbons have come under substantial scientific scrutiny, because it has been postulated that these materials decompose in the stratosphere, under the influence of ultraviolet radiation to release chlorine atoms. Chlorine atoms are theorized to undergo chemical reaction in the stratosphere which could deplete the stratospheric ozone layer, which shields the earth from harmful ultraviolet radiation. A substantial reduction of stratospheric ozone could have a serious deleterious impact on the quality of life on earth.

There is a continuing need in this art for new materials having new combinations of properties for use as refrigerants, aerosol propellants, heat transfer media, gaseous dielectrics, fire extinguishing agents, blowing agents for polyolefins, polystyrene and polyurethanes and as power cycle working fluids. Such compositions must be potentially environmentally safe and function effectively as substitutes for chlorofluorocarbons that are used for these applications, e.g., Refrigerant 502.

There is a limit to the number of single fluorinated hydrocarbon substances which can be candidates as environmentally safe materials. Mixtures of known materials, however, might be used if the desired combination of properties could be found in a given mixture. Simple mixtures, however, create problems in design and operation of refrigeration and other equipment because of component segregation in both the vapor and liquid phases. To avoid component segregation problems, it is particularly desirable to discover new substantially constant boiling fluorocarbon blends. Such blends would not suffer from component segregation problems. Unfortunately, it is not possible to predict the formation of constant boiling compositions, e.g., azeotropes, thus complicating the search for novel compositions which possess the desired combination of properties. There is a need for substantially constant boiling compositions that have properties which make them particularly useful as refrigerants, aerosol propellants, heat transfer media, gaseous dielectrics, fire extinguishing agents, blowing agents for foaming thermoplastics such as polyolefins, polystyrene, polyurethanes and phenolics, such as phenolformaldehydes, resins and that are potentially environmentally safe so that they can be used as substitutes for the chlorofluorocarbons that are now used for these applications.

SUMMARY OF THE INVENTION

The present invention is directed to a binary azeotropic mixture, especially useful as a blowing agent, which consists essentially of 40–99.5 weight %, based on the sum of the weights of (a) and (b), of a fluorocarbon selected from the group consisting of (a) perfluoropropane and 1,1,1,2,3,3,3-heptafluoropropane and (b) 0.5–60 weight %, based on the sum of the weights of (a) and (b), of dimethyl ether. Usually, the azeotropic mixtures contain 40–95 weight % of the fluorocarbon and 5–60 weight % dimethyl ether, based on the sum of the weights of the fluorocarbon and dimethyl ether. Preferably, the azeotropic mixtures contain about 75–95 weight % of the fluorocarbon and about 5–25 weight % dimethyl ether, wherein, as above, the amounts are based on the sum of the weights of said fluorocarbon and dimethyl ether.

For the purpose of this invention, azeotropic or constant boiling is intended to mean also essentially azeotropic or essentially constant boiling. In other words, included within the meaning of these terms are not only the true azeotrope described herein, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which not only will exhibit essentially equivalent properties for refrigeration and other applications, but which will also exhibit essentially equivalent properties to the true azeotropic composition in terms of constant boiling characteristics or tendency not to segregate or fractionate on boiling.

The azeotropic and substantially constant boiling azeotropic mixtures of the invention are useful as blowing agents, refrigerants and as aerosol propellants, among other applications. They have refrigeration energy efficiency performance substantially equivalent for that of CFC-12 alone.

As used herein "a binary azeotropic mixture consisting essentially of" is intended to include mixtures which contain all the components of the azeotrope of this invention (in any amounts) and which, when fractionally distilled, would produce an azeotrope containing all the components of this invention in at least one fraction, alone or in combination with another compound, e.g., one which distills at substantially the same temperature as said fraction.

DETAILED DESCRIPTION OF THE INVENTION

Perfluoropropane and 1,1,1,2,3,3,3-heptafluoropropane are well known compounds that are useful as refrigerants, aerosol propellants and blowing agents to foam polymers. Azeotropic mixtures of these compositions with other components offer the possibility of producing more economical nonfractionating systems having improved properties, including, for example, an increase in solubility in the polymer when used, for example, as a blowing agent for resins, such as polyurethanes, polystyrenes, polyethylenes, polypropylenes, polyvinyl chlorides, polyacrylates, etc., and good solubility in oils when used in refrigeration systems.

The azeotropic mixtures of the present invention were discovered during a phase study wherein the components (a) and (b) of the compositions, as described above, were varied and vapor pressure measured. The perfluoropropane (FC-218)/DME azeotropic composition occurred at the maximum point of the vapor pressure-concentration plot, being at 90.3 weight % FC-218 and 9.7 weight % DME at 0° C. (plus or minus 3.5 weight %). Thus, the FC-218/DME azeotrope is a minimum boiling azeotrope, that is, the vapor pressure of the azeotrope is higher than the vapor pressures of either component of the azeotrope. The 1,1,1,2,3,3,3-heptafluoropropane (HFC-227ea)/DME azeotropic composition occurred at the minimum point of the vapor pressure-concentration plot, being at 87.5 weight % HFC-227ea and 12.5 weight % DME at 0° C. (plus or minus 3.5 weight %). Thus, the HFC-227ea/DME azeotrope is a maximum boiling azeotrope, that is, the vapor pressure of the azeotrope is lower than the vapor pressures of either component of the azeotrope. Vapor pressure is the pressure exerted when a liquified propellant gas is in equilibrium with its vapor in a closed container, e.g., an aerosol can. Vapor pressure can be measured by contacting a pressure gauge to the valve on an aerosol can or gas cylinder containing the vapor/liquid mixture. A standard measure of vapor pressure is pounds per square inch gauge (psig) with the gas/liquid mixture at 70° F.

The compositions of this invention are especially effective blowing agents for polymers. A process for preparing a foamed polymer comprising expanding a polymer with a blowing agent wherein the blowing agent is an azeotropic mixture of perfluoromethane or 1,1,1,2,3,3,3-heptafluoropropane with dimethyl ether in the amounts disclosed herein.

The compositions of this invention are also very effective refrigerants and aerosols. A process for providing refrigeration comprises condensing an azeotropic mixture of perfluoromethane or 1,1,1,2,3,3,3-heptafluoropropane with dimethyl ether in the amounts disclosed herein and thereafter evaporating the azeotropic mixture in the vicinity of a body to be cooled. A further aspect of this invention involves the formulation of aerosol compositions. The aerosol composition comprises a propellant and an active agent wherein the propellant is an azeotropic mixture of perfluoromethane or 1,1,1,2,3,3,3-heptafluoropropane with dimethyl ether in the amounts disclosed herein.

Nonflammable mixtures of these compositions comprise FC-218 or HFC-227ea and DME within the range of about 92.0–99.5 weight % FC-218 or HFC-227ea and 0.5–8.0 weight % of DME. Preferably, the nonflammable mixtures contain from about 92–95 weight % FC-218 or HFC-227ea, the balance being DME, the percentages being based on the sum of the weights of the fluorocarbon and ether.

The binary azeotropic mixtures disclosed herein do not plasticize polystyrene. Thus, these mixtures and, more particularly, nonflammable mixtures of FC-218 or HFC-227ea with DME are excellent blowing agents for thermoplastics, especially for polystyrene.

Additionally, the blends of FC-218 and HFC-227ea with DME containing greater than about 20 weight % DME are soluble in polyurethane polyols, whereas FC-218 and HFC-227ea are insoluble.

The azeotropic mixtures of the present invention can be used to produce refrigerants with energy efficiencies superior to FC-218 or HFC227ea alone. The new refrigerant mixtures can be used in refrigerant applications as described in U.S. Pat. No. 4,482,465 to Gray.

Preferably, the azeotropic mixtures of the present invention are essentially nonflammable. By nonflammable is meant a gas mixture in air will not burn when subjected to a spark igniter as described in "Limits of Flammability of Gases and Vapours", Bulletin 503, H. F. Coward, et al., Washington, U.S. Bureau of Mines, 1952.

The HFC-227ea/dimethyl ether azeotrope of the present invention has a vapor pressure at 70° F. of about 50 psig. This vapor pressure makes the azeotrope attractive and useful as an aerosol propellant.

The azeotropic mixtures of the present invention can be prepared by any convenient method including mixing or combining, by other suitable methods, the desired amounts of the components, using techniques well known to the art.

Specific examples illustrating the invention are given below. Unless otherwise stated, all percentages are by weight. It is to be understood that these examples are merely illustrative and in no way are to be interpreted as limiting the scope of the invention.

EXAMPLE 1

A phase study was made on combinations of perfluoropropane (FC-218) and 1,1,1,2,3,3,3-heptafluoropropane (HFC-227ea) with dimethyl ether (DME) wherein the composition is varied and the vapor pressure measured. Azeotropic compositions were obtained as evidenced by the maximum vapor pressure observed for FC-218/DME and the minimum vapor pressure observed for HFC-227ea/DME. Thus, the minimum boiling azeotrope of FC-218/DME contains 90.3 weight % FC-218 and 9.7 weight % DME at 0° C. (plus or minus 3.5 weight %) and the maximum boiling azeotrope of HFC-227ea/DME contains 87.5 weight % HFC-227ea and 12.5 weight % DME at 0° C. (plus or minus 3.5 weight %).

EXAMPLE 2

An evaluation of the refrigeration properties of the binary azeotropic mixture of the present invention versus FC-218 and HFC-227ea, respectively, is shown in Table I. The data were generated on a one ton basis, that is to say, on the removal of heat from a space at the rate of 12,000 Btu/hr. The data are based on the ideal refrigeration cycle.

TABLE I

Comparison of Refrigeration Performances

| Refrigerant | Capacity (BTU/hr) | C.O.P. | Condenser Pressure (psia) | Evaporator Pressure (psia) |
|---|---|---|---|---|
| CFC-12 | 72.1 | 2.25 | 195.8 | 19.2 |
| CFC-114 | 21.1 | 2.39 | 72.4 | 4.6 |
| FC-218 | 66.7 | 1.68 | 272.0 | 26.0 |
| HFC-227ea | 38.6 | 2.03 | 146.6 | 10.8 |
| FC-218/DME (93.8/6.2) | 73.1 | 1.85 | 266.0 | 25.4 |
| FC-218/DME (90.0/10.0) | 75.1 | 1.92 | 262.0 | 24.7 |
| FC-218/DME (80.0/20.0) | 75.9 | 2.04 | 250.0 | 22.7 |
| HFC-227ea/DME (95.0/5.0) | 42.6 | 2.04 | 158.0 | 11.8 |
| HFC-227ea/DME (87.5/12.5) | 47.9 | 2.07 | 171.0 | 13.0 |
| HFC-227ea/DME (80.0/20.0) | 52.7 | 2.12 | 178.0 | 14.1 |

Condenser Temperature: 130° F.
Evaporator Temperature: −10° F.
Suction Superheated to: 80° F.
Subcool: 0° F.

Coefficient of Performance (C.O.P.) is a measure of refrigerant energy efficiency. The performance data show that compositions containing mixtures of FC-218 and HFC-227ea each with DME are more efficient refrigerants than FC-218 or HFC-227ea alone. Also the mixtures are only slightly less efficient than CFC-12 and CFC-114.

Additives such as lubricants, corrosion inhibitors, stabilizers, dyes and other appropriate materials can be added to the azeotropic mixtures of the present invention for a variety of purposes.

EXAMPLE 3

An aerosol room freshener was prepared with the HFC-227ea/DME azeotrope (87.5/12.5). The formulation and vapor pressure are shown in Table II.

TABLE II

Aerosol Room Freshener Formulation

| Ingredient | Wt. % |
|---|---|
| Perfume | 2.0 |
| HFC-227ea/DME (87.5/12.5) | 98.0 |
| Vapor Pressure at 70° F. psig | 49.5 |

EXAMPLE 4

The solubility of blends of FC-218/DME and HFC-227ea/DME is determined in a polyurethane polyol. The mixtures are much more fluid with DME than in the case of FC-218 and HFC-227ea alone. The solubility data are shown in Table III.

Polyurethane foams made with FC-218 and HFC-227ea were poor, with high densities and large non-uniformly distributed cells. Much of the blowing agents escaped during the exothermal reaction sequence because of their poor solubility in the polyol/reaction mixture. In the case of the FC-218/DME and HFC-227ea/DME blends, the foams produced were lower in densities with more uniform fine cells. This better performance of the blends is largely attributable to their better solubilities in the systems.

TABLE III

Solubility of Blends of FC-218/DME and HFC-227ea/DME in Polyol*

| Blowing Agent** | Appearance |
|---|---|
| FC-218 | Insoluble, two phases, viscous |
| HFC-227ea | Insoluble, two phases, viscous |
| FC-218/DME (80/20) | Hazy, less viscous than for FC-218 |
| FC-218/DME (70/30) | Hazy, much more fluid than for FC-218 |
| HFC-227ea/DME (80/20) | Hazy, less viscous than for HFC-227ea |
| HFC-227ea/DME (70/30) | Hazy, much more fluid than for HFC-227ea |

*Stepanol ® PS-2852 (Stepan Company), an aromatic polyester polyol.
**In all samples, the concentration of blowing agent in polyol was 30.0 weight %.

EXAMPLE 5

The solubility of the FC-218/DME azeotrope (90.3/9.7) and the HFC-227ea/DME azeotrope (87.5/12.5) in polystyrene was determined by combining a piece of polystyrene (about 2.5 cm long, 0.5 cm wide and 0.05 cm thick) with about 50 g azeotrope. The azeotropes, FC-218 and HFC-227ea showed little or no solvency for polystyrene, producing no plasticization of the thermoplastic polymer. The data are summarized in Table IV.

The lack of solubility of the FC-218 and HFC-227ea azeotropes of DME in polystyrene is important for two reasons:

(1) With poor solubility in polystyrene, the azeotropes will not plasticize polystyrene and thus will not cause foam shrinkage and/or loss in structural strength of polystyrene foam.
(2) Because of their poor solubility in polystyrene, these azeotropes are useful in appliance foams where they should not attack the polystyrene liners commonly used in freezers and refrigerators.

TABLE IV

Solubility of FC-218/DME and HFC-227ea/DME Azeotropes in Polystyrene

| Blowing Agent | Appearance of Polystyrene |
|---|---|
| FC-218 | No effect |
| HFC-227ea | No effect |
| FC-218/DME (90.3/9.7) | Slight swelling |
| HFC-227ea/DME (87.5/12.5) | No effect |
| DME | Polystyrene dissolved |

I claim:

1. A minimum boiling point binary azeotropic mixture, consisting essentially of 40–99.5 weight percent, based on the sum of the weights of (a) and (b), of (a) perfluoropropane and (b) 0.5–60 weight percent, based on the sum of the weights of (a) and (b), of dimethyl ether said minimum boiling point azeotrope consisting of 90.3 weight percent perfluoropropane and 9.7 weight percent dimethyl ether at 0° C.

2. A composition of claim 1 consisting essentially of 40–95 weight % of the perfluoropropane and 5–60 weight % of dimethyl ether.

3. A composition of claim 1 consisting essentially of 75–95 weight % of the perfluoropropane and 5–25 weight percent dimethyl ether.

4. In a process for preparing a foamed polymer comprising expanding a polymer with a blowing agent, the improvement wherein the blowing agent is a composition of claim 1.

5. In a process for preparing a foamed polymer comprising expanding a polymer with a blowing agent, the improvement wherein the blowing agent is a composition of claim 2.

6. In a process for preparing a foamed polymer comprising expanding a polymer with a blowing agent, the improvement wherein the blowing agent is a composition of claim 3.

7. A process for providing refrigeration which comprises condensing the composition of claim 1 and thereafter evaporating the composition in the vicinity of a body to be cooled.

8. A process for providing refrigeration which comprises condensing the composition of claim 2 and thereafter evaporating the composition in the vicinity of a body to be cooled.

9. In an aerosol composition comprising a propellant and an active agent, the improvement wherein the propellant is a composition of claim 1.

10. In an aerosol composition comprising a propellant and an active agent, the improvement wherein the propellant is a composition of claim 2.

* * * * *